United States Patent
Guanter et al.

(10) Patent No.: US 11,487,379 B2
(45) Date of Patent: Nov. 1, 2022

(54) PORTABLE TOUCH OBJECT WITH SIMPLIFIED TURNING OFF OF TOUCH KEYS

(71) Applicant: The Swatch Group Research and Development Ltd, Marin (CH)

(72) Inventors: Jean-Charles Guanter, Diesse (CH); Pascal Heck, Erlach (CH); Jean-Nicolas Pfeuti, Hauterive (CH)

(73) Assignee: The Swatch Group Research and Development Ltd, Marin (CH)

( * ) Notice: Subject to any disclaimer, the term of this patent is extended or adjusted under 35 U.S.C. 154(b) by 43 days.

(21) Appl. No.: 15/326,773

(22) PCT Filed: Jul. 16, 2015

(86) PCT No.: PCT/EP2015/066316
§ 371 (c)(1),
(2) Date: Jan. 17, 2017

(87) PCT Pub. No.: WO2016/012349
PCT Pub. Date: Jan. 28, 2016

(65) Prior Publication Data
US 2017/0205940 A1 Jul. 20, 2017

(30) Foreign Application Priority Data
Jul. 24, 2014 (EP) .................................. 14178356

(51) Int. Cl.
*G06F 3/041* (2006.01)
*G04G 21/08* (2010.01)
(Continued)

(52) U.S. Cl.
CPC ........... *G06F 3/0416* (2013.01); *G04G 21/08* (2013.01); *G06F 1/3262* (2013.01); *G06F 3/042* (2013.01); *G06F 3/044* (2013.01); *G06F 3/045* (2013.01)

(58) Field of Classification Search
CPC ...... G06F 3/041; G06F 3/0412; G06F 3/0416; G06F 3/0414; G06F 3/042; G06F 3/044; G06F 3/045; G06F 1/3262; G04G 21/08
(Continued)

(56) References Cited

U.S. PATENT DOCUMENTS

| 4,477,797 A | 10/1984 | Nakagiri |
| 5,812,498 A | 9/1998 | Teres |

(Continued)

FOREIGN PATENT DOCUMENTS

| EP | 1 284 450 A2 | 2/2003 |
| EP | 2 086 211 A1 | 8/2009 |
| GB | 2 092 352 A | 8/1982 |

OTHER PUBLICATIONS

International Search Report dated Oct. 1, 2015 in PCT/EP2015/066316 filed Jul. 16, 2015.

*Primary Examiner* — Jimmy H Nguyen
(74) *Attorney, Agent, or Firm* — Oblon, McClelland, Maier & Neustadt, L.L.P.

(57) ABSTRACT

A portable object including a case formed of a frame closed by a glass forming a housing, in which an electronic module is placed, the electronic module cooperating with a controller including at least one plurality of touch pads for interacting with the electronic module, each touch pad being located on an inner/outer surface of the case, the electronic module being programmed to operate in a first operating
(Continued)

mode in which at least the touch pads are activated and to operate in a second operating mode in which at least the touch pads are deactivated.

19 Claims, 5 Drawing Sheets

(51) Int. Cl.
*G06F 1/3234* (2019.01)
*G06F 3/042* (2006.01)
*G06F 3/045* (2006.01)
*G06F 3/044* (2006.01)

(58) Field of Classification Search
USPC .................................. 345/173–178
See application file for complete search history.

(56) References Cited

U.S. PATENT DOCUMENTS

| | | | |
|---|---|---|---|
| 6,476,797 B1 | 11/2002 | Kurihara et al. | |
| 6,677,934 B1 * | 1/2004 | Blanchard | G06F 3/0421 |
| | | | 250/221 |
| 7,778,115 B2 * | 8/2010 | Ruchonnet | G01L 7/163 |
| | | | 368/101 |
| 2003/0034185 A1 * | 2/2003 | Kaikuranta | G06F 3/038 |
| | | | 178/18.01 |
| 2004/0047242 A1 | 3/2004 | Germiquet et al. | |
| 2004/0108861 A1 | 6/2004 | Germiquet et al. | |
| 2005/0113940 A1 * | 5/2005 | Frenkel | G06F 1/3228 |
| | | | 700/14 |
| 2009/0015514 A1 * | 1/2009 | Suzuki | B63C 11/02 |
| | | | 345/3.1 |
| 2009/0061823 A1 | 3/2009 | Chu | |
| 2010/0099394 A1 * | 4/2010 | Hainzl | H04W 52/027 |
| | | | 455/418 |
| 2010/0296369 A1 | 11/2010 | Tortora | |
| 2012/0075964 A1 * | 3/2012 | Hirayama | G04B 37/084 |
| | | | 368/281 |
| 2013/0141381 A1 | 6/2013 | Yilmaz et al. | |
| 2013/0235704 A1 | 9/2013 | Grinberg | |
| 2015/0062069 A1 * | 3/2015 | Shin | G06F 3/044 |
| | | | 345/174 |
| 2015/0095780 A1 | 4/2015 | Chu | |

* cited by examiner

PORTABLE TOUCH OBJECT WITH SIMPLIFIED TURNING OFF OF TOUCH KEYS

CROSS-REFERENCE TO RELATED APPLICATIONS

This is a National phase application in the United States of International patent application PCT/EP2015/066316 filed Jul. 16, 2015 which claims priority on European patent application 14178356.3 filed Jul. 24, 2014. The entire disclosures of the above patent applications are hereby incorporated herein by reference.

The present invention concerns a portable object including a case closed by a glass forming a housing, inside which is arranged an electronic module cooperating with control means. These control means include at least one plurality of touch keys.

BACKGROUND OF THE INVENTION

There are known portable objects such as electronic watches 1. These electronic watches, visible in FIG. 1, include a case 3 formed of a case middle 5 closed by a back cover and a glass 7; display means 9 are arranged underneath the glass.

Figure 1:
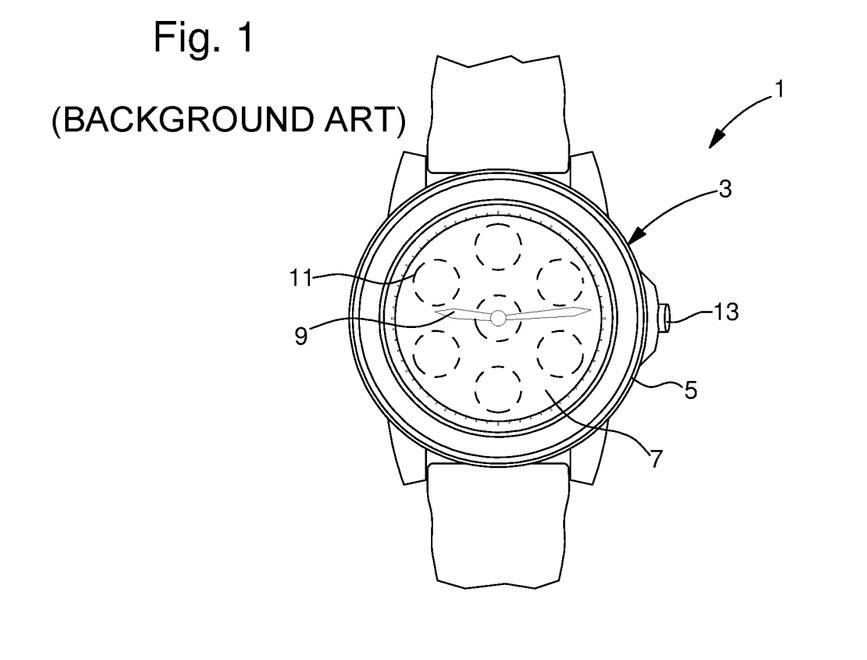
FIGS. 1 and 2 show a portable object according to the prior art.

These electronic watches include an electronic module cooperating with control means. The control means include at least one plurality of touch keys 11.

In general, in watches with these touch keys, it is desired to be able to turn off the touch system in order to save energy or to prevent a simple contact with one of the keys causing a disruption of the watch, such as a modification of the display or even a programme modification. Indeed, the touch keys, for example of the capacitive type, are permanently scanned at a frequency of between 2 Hz and 100 Hz to detect any contact. This permanent scanning therefore consumes energy.

Thus, the touch keys are switched on by means of a button 13, which may be the crown.

Figure 2:
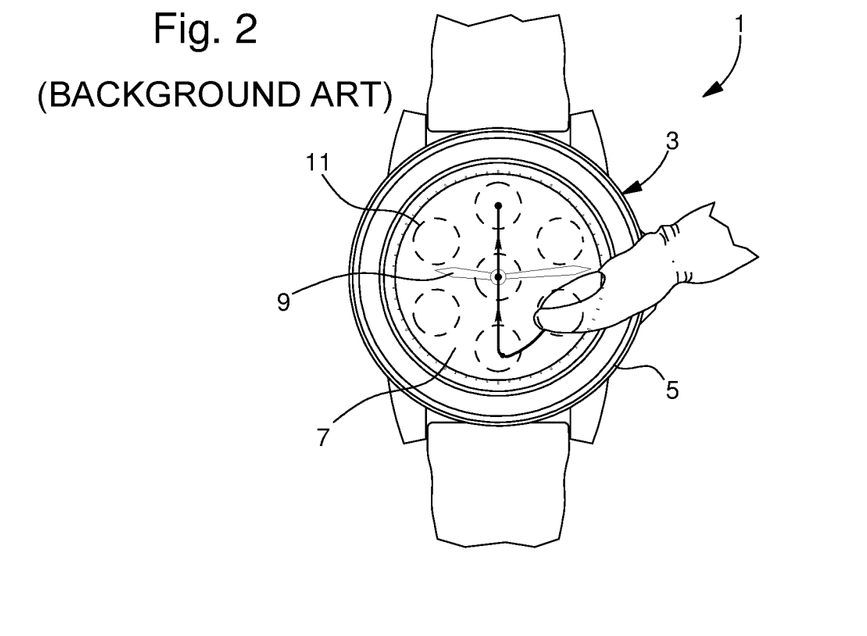

To switch off the touch keys, there may be provided, for example, a specific power off sequence, as seen in FIG. 2, a timeout period, i.e. if none of the keys are activated during a determined time period, switching off occurs, or a power off button.

However, one drawback of a specific power off operation is that the user has to remember it.

Further, a drawback of the timeout is its very duration, which leaves an unused system switched on for several seconds and thus able to be inadvertently activated.

One drawback of the button solution is that it is then necessary to have a specific button in order for the operation performed to be the same from anywhere in the programme. However, a dedicated button requires a more complex design of the case of the portable object.

SUMMARY OF THE INVENTION

It is an object of the invention to overcome the drawbacks of the prior art by proposing to provide a portable object whose touch interface can be very simply turned off.

To this end, the present invention consists of a portable object including a case, formed of a case middle closed by a glass and a back cover, forming a housing in which an electronic module is placed, said electronic module cooperating with control means including at least one plurality of contact pads for interacting with the electronic module, each contact pad being located on one surface of the case, said electronic module being programmed to operate in a first operating mode, in which at least the contact pads are activatable and to operate in a second operating mode, in which at least the contact pads are not activatable, characterized in that the change from the first operating mode to the second operating mode occurs following detection by said electronic module of the simultaneous activation of at least a determined number of contact pads, the activated touch pads being randomly selected.

The advantage of the present invention is that it does not require an additional specific button or a timeout period to make the change from the first operating mode to the second operating mode.

In a first advantageous embodiment, the determined number of activated contact pads required to change from the first operating mode to the second operating mode is equal to at least 50% of the number of contact pads present.

In a second advantageous operating mode, the determined number of activated contact pads required to change from the first operating mode to the second operating mode is equal to the total number of contact pads present.

In a third advantageous embodiment, activation of the touch pads occurs by contact with a body causing a disturbance of the electrical field seen by the touch pad.

In a fifth advantageous embodiment, the body causing a disturbance of the electric field is a volume of water.

In a sixth advantageous embodiment, activation of the touch pads occurs by pressure with a body causing, by the effect of resistance, the appearance of a voltage on the touch pad.

In a seventh advantageous embodiment, activation of the touch pads occurs by pressure applied by a body causing, by piezoelectric effect, the appearance of a voltage on the touch pad.

In another advantageous embodiment, activation of the touch pads occurs by pressure applied by a body causing optical disturbance of the touch pad.

The invention also concerns a portable object including a case formed of a frame closed by a screen forming a housing in which an electronic module is placed, said screen including a glass associated with an electric detection grid forming control means, or contacts, cooperating with the electronic module to interact therewith, said electronic module being programmed to operate in a first operating mode, in which at least the screen is activated and to operate in a second operating mode, in which at least the screen is deactivated, characterized in that the change from the first operating mode to the second operating mode occurs following detection by said electronic module of at least a determined number of activated random areas.

In a first advantageous embodiment, the determined number of activated areas is equal to at least three.

In a second advantageous embodiment, the determined number of activated areas is equal to at least the number of fingers of one hand.

In a third advantageous embodiment, the screen is of the capacitive type, activation being performed with a body causing a disturbance of the electric field.

In a fourth advantageous embodiment, the screen is of the resistive type.

In a fifth advantageous embodiment, the screen is of the optical type.

In another advantageous embodiment, the screen is of the piezoelectric type.

In another advantageous embodiment, the body causing a disturbance of the electric field is a volume of water.

In another advantageous embodiment, the first operating mode is a normal operating mode in which the electronic module is active, the second operating mode being a standby operating mode in which the electronic module is inactive.

In another advantageous embodiment, the first operating mode is a normal operating mode in which said portable object is active, the second operating mode being an operating mode in which the portable object is powered off.

In another advantageous embodiment, the first operating mode is a normal operating mode in which a chronograph function of the electronic module is inactive, the second operating mode being an operating mode in which said chronograph function is active.

BRIEF DESCRIPTION OF THE DRAWINGS

The objects, advantages and features of the invention will appear more clearly in the following detailed description of at least one embodiment of the invention, given solely by way of non-limiting example and illustrated by the annexed drawings, in which.

DETAILED DESCRIPTION OF THE INVENTION

The present invention proceeds from the general inventive idea of providing a simple operation for turning off/deactivating at least the touch keys of a portable object such as a watch.

Figure 3:
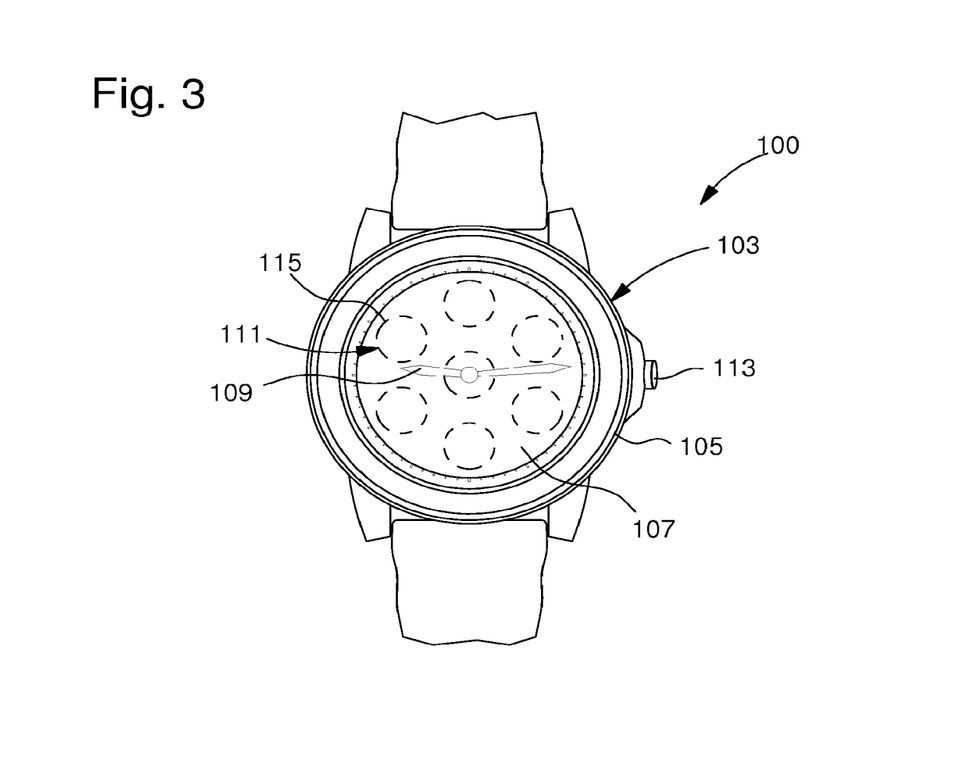
FIGS. 3 to 6 show a first embodiment of the portable object and operations performed thereon according to the invention.
Figure 4:
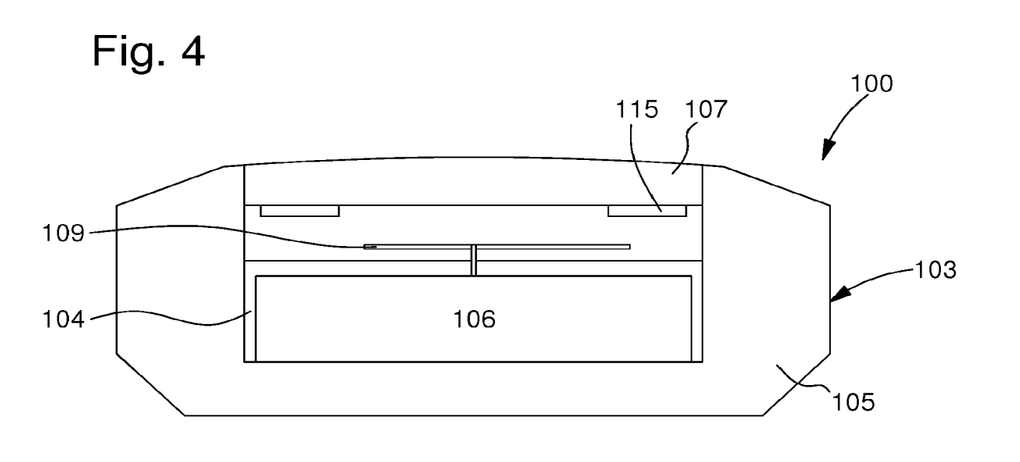

In a first embodiment visible in FIGS. 3 and 4, a portable object 100 according to the invention is shown. This portable object 100, a watch here, includes a case 103. This case 103 is formed of a frame 105 closed by a glass 107; the frame may be formed of two parts, such as a case middle to which a back cover is secured in the example of a watch. Frame 105 closed by the glass forms a housing 104, in which an electronic module 106 is placed. This electronic module includes, for example, a microcontroller powered by a battery and communicating with display means 109 or even sensors.

The electronic module also cooperates with control means 111, which are touch control means.

Of course, the control means may also include at least one push-button 113.

According to the invention, the electronic module is programmed to operate in a first operating mode, in which touch control means 111 are active, and a second operating mode, in which touch control means 111 are inactive.

These control means 111 include a plurality of touch keys used to interact with electronic module 106. These touch keys are arranged in the case, that is to say in the frame or the glass, for example on the inner surface. If the touch keys are arranged in frame 105, the frame must be made of an appropriate material according to the technology used. For example, in the case of capacitive touch keys, the material that carries the electrodes must be electrically insulating. In the case of a watch, the touch keys may be located in the part acting as case middle, bezel or in the glass.

Touch keys using capacitive technology are arranged in the form of electrically conductive electrodes, which may or may not be transparent, for example under/on the glass, bezel or case middle. These touch keys take the form of conductive touch pads 115, so that when the user places his finger on an area where a pad is arranged, an electric field variation occurs. This electric field variation causes a capacitance variation. Electronic module 106 will detect and interpret this capacitance variation indicating the presence of the finger.

Advantageously according to the invention, the change from the first operating mode to the second operating mode occurs by simultaneously activating a determined number of pads 115. Activation of these pads 115 may be a light touch, a press or any operation by the user allowing activation of pads 115.

The predetermined number of pads 115 simultaneously activated to change from the first operating mode to the second operating mode is selected to be clearly distinct from any existing operations performed on the portable object.

In this regard, it will be assumed that the change from the first operating mode to the second operating mode occurs when at least half of contact pads 115 are simultaneously activated.

Figure 5:
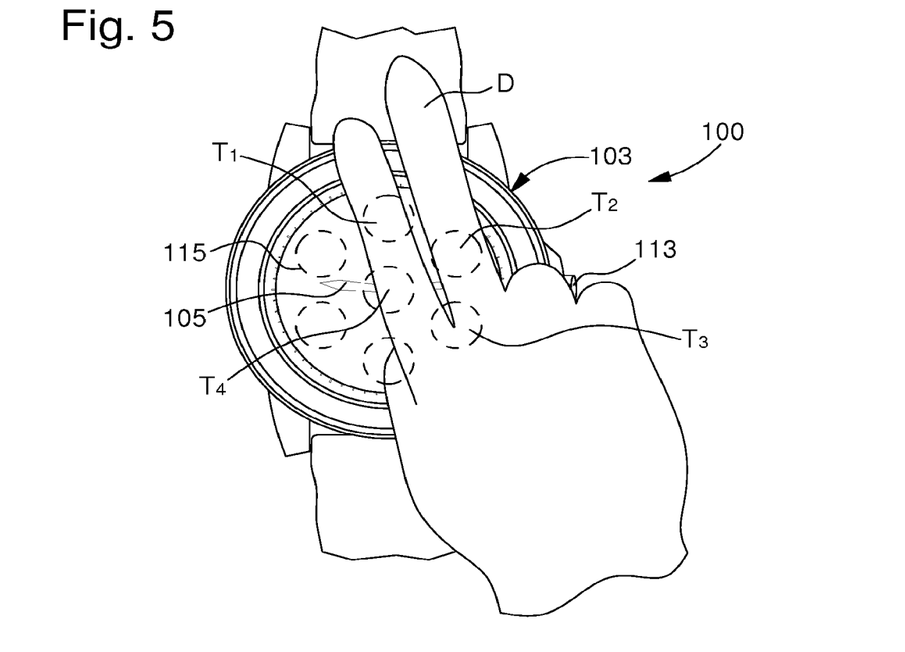

For example, for a Tissot T-Touch® watch including 7 touch keys, 6 contact pads at the periphery of the glass and a central contact pad, the change from the first operating mode to the second operating can occur when at least 3 pads are simultaneously activated. This operation is quite distinct from basic operations, since the programming of this watch provides a pad for each function and thus does not provide for simultaneous pressure on several pads. These 3 keys to be simultaneously activated may be activated by using a thumb or two fingers D as seen in FIG. 5 which shows at least four pads T1, T2, T3, T4 activated.

Figure 6:
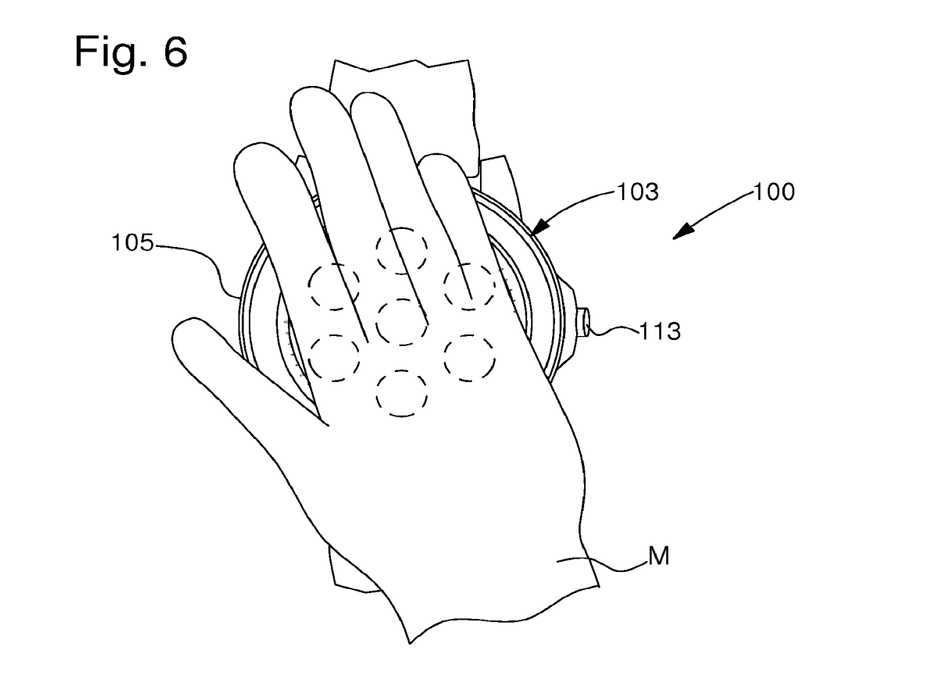

Preferably, the change from the first operating mode to the second operating mode occurs when all of pads 115 are simultaneously activated by the user. Typically, for a Tissot T-Touch® watch including 7 contact pads, activation of all of pads 115 occurs by placing a hand M on the glass as seen in FIG. 6.

The advantage of this type of operation, i.e. placing hand M on glass 108 to initiate the change from the first operating mode to the second operating mode, is that it is simple since it requires no specific targeted action on the part of the user. Indeed, the user places his hand M on the glass and activation of all of the pads is detected, resulting in a change from the first operating mode to the second operating mode.

Of course, it is possible to envisage using resistive, piezoelectric or optical technologies for the touch keys.

Thus, for resistive technology, one of the surfaces of the portable object may locally include a conductive layer and a plastic film whose underside is conductive (resistive ITO). The surface of the portable object and the plastic film are held apart from each other by microscopic spacers. An electric current is induced in one of the two conductive faces during the operation. When the user touches the screen with the tip of a stylus (or a finger), the pressure exerted initiates a contact between the two electrically powered faces.

In the case of piezoelectric technology, the detection grid is devised to convert a pressure applied by the user, i.e. a stress, into an electric signal. The pressure on the touch key generates a stress converted into an electric signal which, once detected, allows position determination.

In the case of optical technology, the detection grid uses optical technology, i.e. an optical array. A pressure applied by the user on the touch key causes local deformation of the key. This deformation causes a modification of the optical array. This modification is detected and located to retrieve position information.

Figure 7:
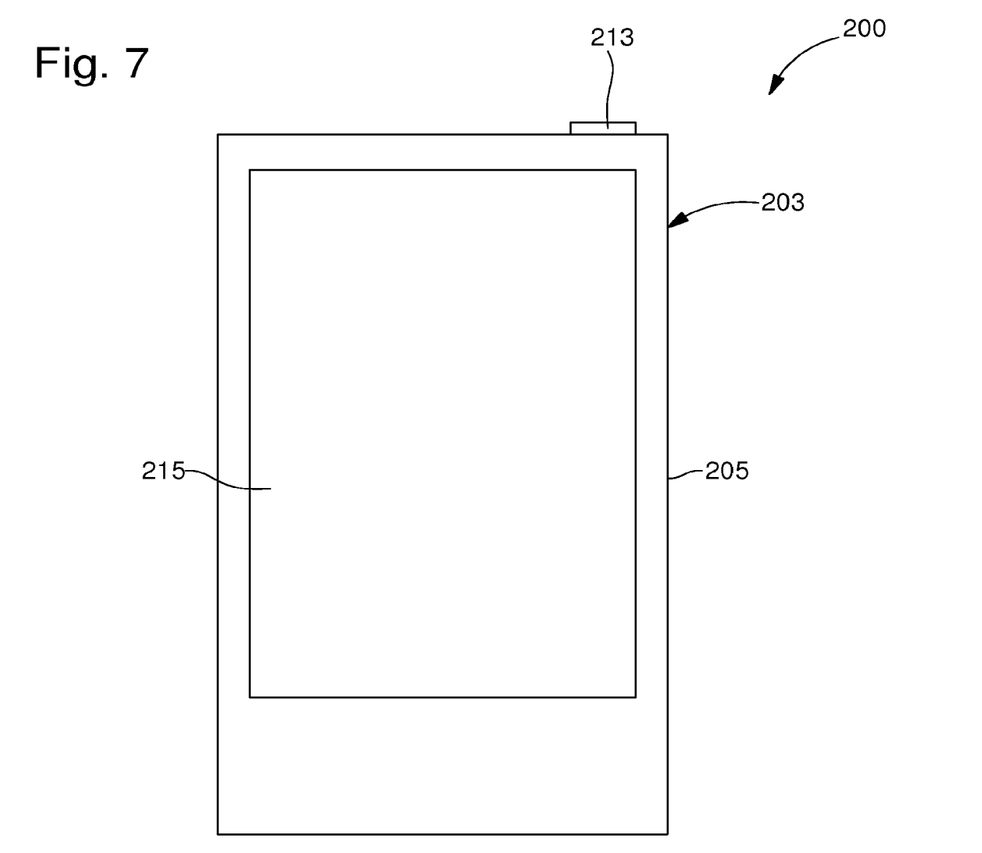
FIGS. 7 to 10 show a second embodiment of the portable object and operations performed thereon according to the invention.
Figure 8:
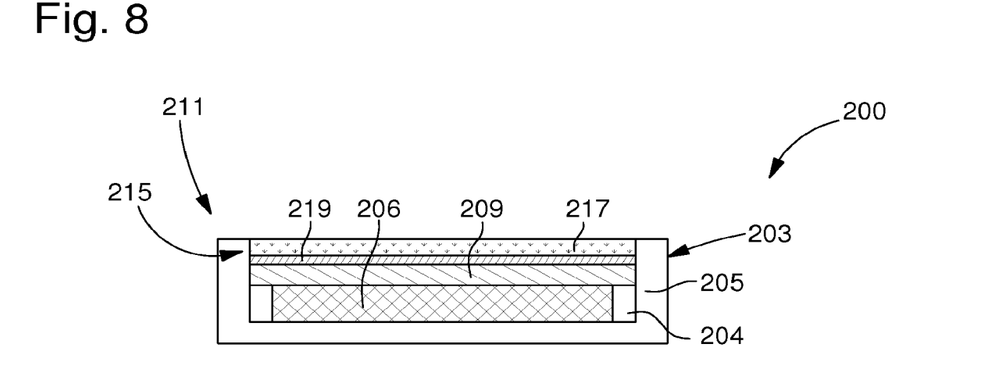

In a second embodiment visible in FIGS. 7 and 8, a portable object 200 according to the invention is shown. This portable object 200, a mobile telephone or tablet here, includes a case 203. This case 203 includes a frame 205 closed by a glass 207. Frame 205 closed by the glass forms a housing 204, in which an electronic module 206 is placed. The electronic module 206 includes, for example, a microprocessor powered by a battery and communicating with display means 209, and possible sensors.

The electronic module also cooperates with control means 211, which are touch control means.

Of course, the control means may also include at least one push-button 213.

Control means 211 are a touch screen 215 used to interact with the electronic module. A touch screen 21 is generally formed of a glass or polymer plate 217 associated with an electric detection grid 219. A touch screen of this type may use capacitive or resistive technology. Other technologies, such as optics or piezoelectricity may also be used, depending on the application.

A resistive screen is formed of a glass plate whose surface is conductive (resistive ITO). The latter is coated with a plastic film whose underside is conductive (resistive ITO). These two layers are held apart from each other by microscopic spacers. An additional surface layer may be added to prevent scratches (for example, by stylus tips). An electric current is induced in one of the two conductive faces during the operation. When the user touches the screen with the tip of a stylus (or a finger), the pressure exerted initiates a contact between the two electrically powered faces. Measurement of the voltage at the electrode terminals of the other conductive face allows determination of the position of the finger or of the stylus. Once coordinates have been determined, software processing by the system starts and determines which areas have been activated.

In a capacitive screen, a conductive, for example indium-based, layer is placed on a plate made of glass, or any other electrically insulating material, and then structured into a touch pad array. The presence of the user's finger modifies the distribution of the electric field lines in space, which corresponds to a capacitance variation of the various touch pads. The capacitance variation of the touch pads is measured at regular intervals and is interpreted by the electronic module which will deduce the position of the user's finger therefrom.

In the case of piezoelectric technology, the detection grid is devised to convert a pressure applied by the user, i.e. a stress, into an electric signal. Pressure on the flexible face of the screen generates a stress converted into an electric signal.

In the case of optical technology, the detection grid uses optical technology, i.e. an optical array. A pressure applied by the user on the screen causes local deformation of the screen. This deformation causes a modification of the optical array. This modification is detected and located to retrieve position information.

Advantageously according to the invention, the change from the first operating mode to the second operating mode occurs by detecting a predetermined number of activated areas $Z_i$ on touch screen 215. Activation of these areas $Z_i$ on screen 215 may be a light touch, a tap or any operation by the user allowing activation of touch screen 215.

The predetermined number of areas $Z_i$ simultaneously activated to change from the first operating mode to the second operating mode is selected to be clearly distinct from any existing operations performed on portable object 200.

Figure 9:
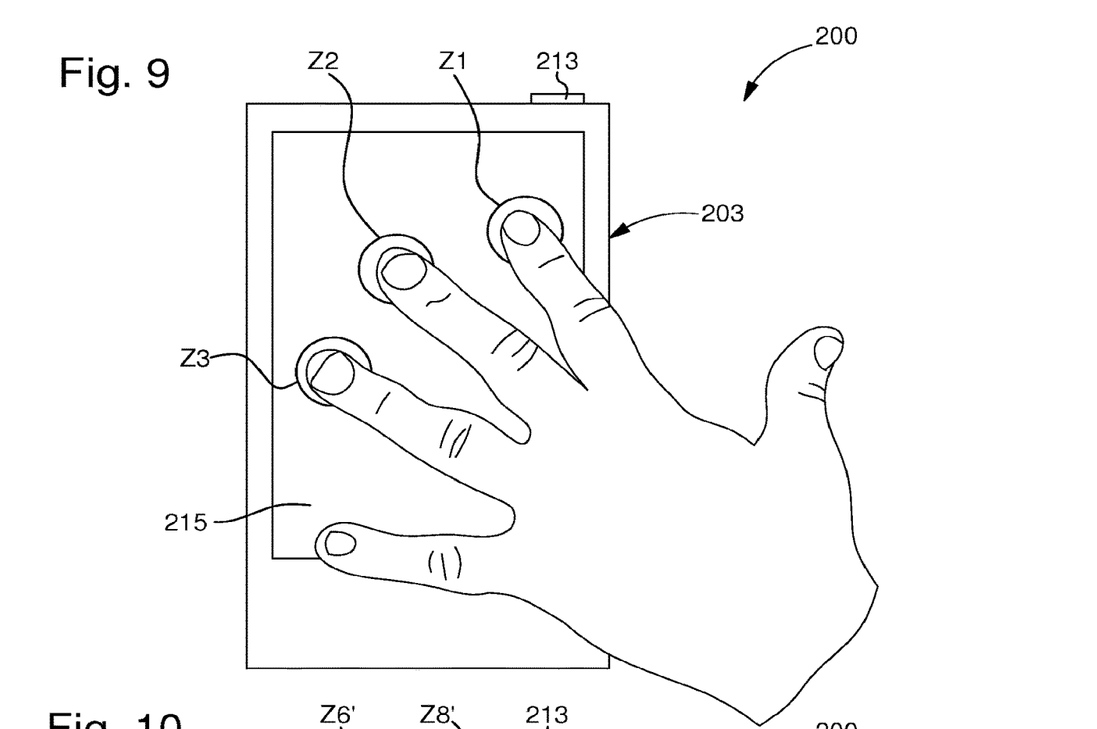

In this regard, it will be assumed that the change from the first operating mode to the second operating mode occurs when at least three areas $Z_1$, $Z_2$, $Z_3$ are simultaneously detected as seen in FIG. 9. Indeed, for current smart phones, the most common multi-touch function consists in using two fingers simultaneously to manipulate an image, an object, in order, for example, to enlarge or pivot it. Preferably, it will be assumed that the change from the first operating mode to the second operating mode occurs when five areas ($Z_i$) are simultaneously detected (not shown). This therefore means that the user places the fingers of one hand on the screen to change from one mode to the other.

Figure 10:
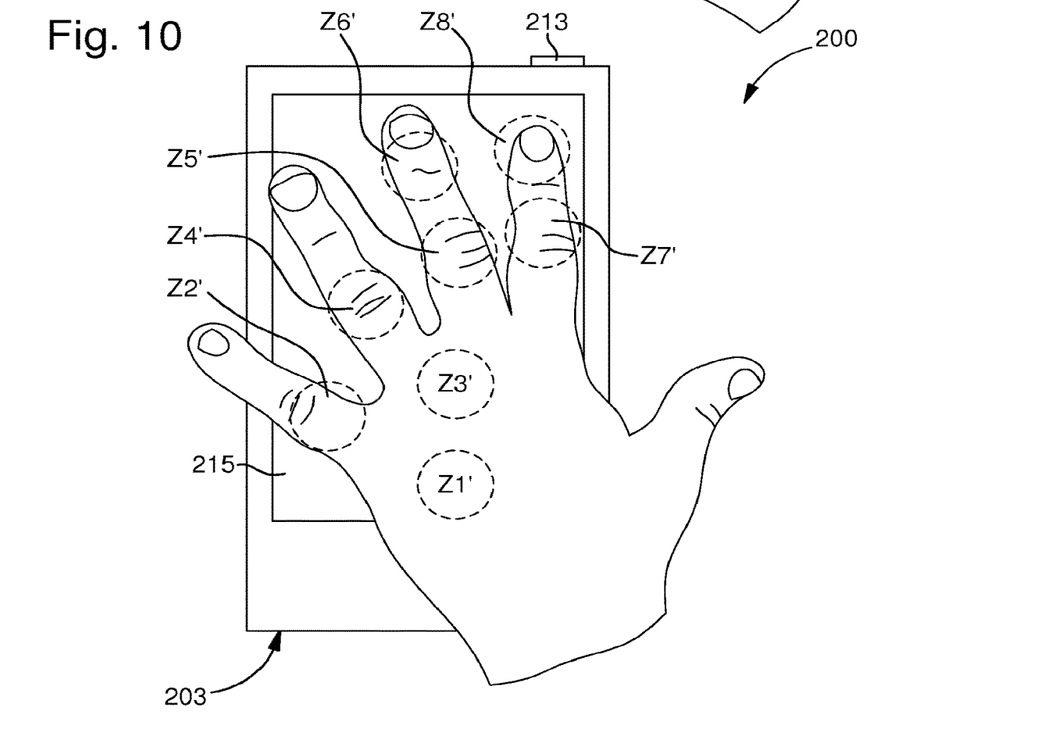

More preferentially still, it will be assumed that the change from the first operating mode to the second operating mode occurs when more than five areas $Z_i$ are simultaneously activated, i.e. when the user's entire hand M is placed on said screen as visible in FIG. 10.

The advantage of such an operation, i.e. placing the hand on the screen to initiate the change from the first operating mode to the second operating mode, is that it is simple since it requires no specific targeted action on the part of the user. In the case of a latest generation mobile telephone with a diagonal screen size of around four to five inches (8 to 13 cm), activation of half of the touch keys is achieved by placing a hand on the screen, i.e. a very simple operation.

In a first embodiment, the first operating mode is a normal operating mode in which the touch keys allow the user to use functions or to set the watch. The second operating mode is thus an economical operating mode in which the touch keys are inactive, thus saving energy and preventing undesired operations.

In a second embodiment, the first operating mode is an operating mode in which a specific function is inactive, while the second operating mode is an operating mode in which the specific function becomes active. In fact, for some simple functions like the countdown or chronograph function, quick start is required to avoid wasting time during activation of the function.

In a variant of the first and second embodiments, it is possible to envisage the change from the first operating mode to the second operating mode occurring automatically in certain conditions. Indeed, in certain conditions, activation of the touch keys or a multitude of pressures can be detected without the user actually having acted on the glass or the screen. For example, the capacitive technology of touch screens with capacitive keys or capacitive touch screens is sensitive to water. This means that, when the portable object provided with a touch glass with capacitive keys or with a capacitive touch screen is immersed in water, the touch keys of the glass or of the touch screen will be activated to a greater or lesser extent. The electronic module will then assume that the user is placing his hand on the glass or the screen, and will thus initiate the change from the first operating mode to the second operating mode.

This variant advantageously permits a solution in which a chronograph function is started when the swimmer enters the water, the water activating the capacitive keys of the touch glass. This facilitates the release of the chronograph function.

This variant provides another solution in which a function of powering off the portable object is activated if said portable object is in water. This attempts to save the portable object in the event that it falls into water.

It will be clear that various alterations and/or improvements and/or combinations evident to those skilled in the art may be made to the various embodiments of the invention set out above without departing from the scope of the invention defined by the annexed claims.

Thus, it is possible to envisage providing the portable object with a specific button for deactivating the touch control means or programming it with a deactivation operation. Further, a countdown or timeout may be possible.

The invention claimed is:

1. A portable object comprising:
an electronic module;
a case including a frame closed by glass to form a housing in which the electronic module is placed, the glass having a periphery enclosed by the frame; and
a controller including at least a plurality of touch pads for interacting with the electronic module, the electronic module cooperating with the controller, each touch pad being located on an inner surface of the glass and spaced apart from the periphery of the glass, wherein the electronic module is programmed to:
be in a first operating mode in which each touch pad is electrically activatable,
be in a second operating mode in which each touch pad is not electrically activatable,
change from the first operating mode to the second operating mode in response to a detection of a simultaneous activation of at least two of the touch pads, the at least two of the touch pads being simultaneously activated including an inner touch pad and an outer touch pad, the outer touch pad being positioned in an outer region that is adjacent to the periphery of the glass, and the inner touch pad being positioned in an inner region that is surrounded by the outer region, and
activate a function in response to the detection of the simultaneous activation of the at least two touch pads including the inner touch pad and the outer touch pad, the function remaining functionally active and drawing power during the second operating mode,
the function includes a chronograph function of the electronic module,
when changing from the first operating mode to the second operating mode in response to the detection of the simultaneous activation of the at least two touch pads, the electronic module is programmed to activate the chronograph function in response to only the detection of the simultaneous activation of the at least two touch pads, and
the second operating mode is an operating mode in which the chronograph function is functionally active and drawing power.

2. The portable object according to claim 1, wherein the at least two touch pads is equal to at least 50% of a total number of touch pads present.

3. The portable object according to claim 1, wherein the at least two touch pads is equal to a total number of touch pads present.

4. The portable object according to claim 1, wherein the activation of the touch pads occurs by variation of an electric field in the touch pads.

5. The portable object according to claim 4, wherein the variation of the electric field is caused by a volume of water.

6. The portable object according to claim 1, wherein the activation of the touch pads occurs by pressure applied on the touch pads.

7. The portable object according to claim 1, wherein the activation of the touch pads causes modification of an optical array of each of the activated touch pads.

8. The portable object according to claim 1, wherein the first operating mode is an operating mode in which the electronic module is active, and
the second operating mode is a standby operating mode.

9. The portable object according to claim 1, wherein the inner touch pad is positioned in a center of the inner region.

10. A portable object comprising:
an electronic module;
a controller cooperating with the electronic module to interact therewith; and
a case formed of a frame closed by a glass forming a housing in which the electronic module is placed, the glass being associated with an electric detection grid of the controller, the electric detection grid being placed on an inner surface of the glass, and the glass and the electric detection grid forming a screen,
wherein the electronic module is programmed to:
be in a first operating mode in which at least the screen is activated,
be in a second operating mode in which at least the screen is deactivated,
change from the first operating mode to the second operating mode in response to a detection of at least a determined number of simultaneously activated areas, the at least the determined number of simultaneously activated areas including plurality of inner activated areas and an outer activated area, the outer activated area being positioned in an outer region of the screen that is adjacent to a periphery of the glass, and the inner activated areas being positioned in an inner region of the screen that is surrounded by the outer region, and
activate a function in response to the detection of the at least the determined number of simultaneously activated areas including the inner activated areas and the outer activated area, the function remaining functionally active and drawing power during the second operating mode,
the function includes a chronograph function of the electronic module,
when changing from the first operating mode to the second operating mode in response to the detection of the at least the determined number of simultaneously activated areas, the electronic module is programmed to activate the chronograph function in response to only the detection of the at least the determined number of simultaneously activated areas, and
the second operating mode is an operating mode in which the chronograph function is functionally active and drawing power.

11. The portable object according to claim 10, wherein the determined number of activated areas is equal to at least three.

12. The portable object according to claim 10, wherein the determined number of activated areas is equal to five.

13. The portable object according to claim 10, wherein the screen is of a capacitive type, activation being achieved by causing variation of an electric field.

14. The portable object according to claim 13, wherein the variation of the electric field is caused by a volume of water.

15. The portable object according to claim 10, wherein the screen is of a resistive type.

16. The portable object according to claim 10, wherein the screen is of an optical type.

17. The portable object according to claim 10, wherein the screen is of a piezoelectric type.

18. The portable object according to claim 10, wherein
the first operating mode is an operating mode in which the electronic module is active, and
the second operating mode is a standby operating mode.

19. A portable object comprising:
an electronic module;
a case including a frame closed by glass to form a housing in which the electronic module is placed, the glass having a periphery enclosed by the frame; and
a controller including at least a plurality of touch pads for interacting with the electronic module, the electronic module cooperating with the controller, each touch pad being located on an inner surface of the glass and spaced apart from the periphery of the glass, wherein
the electronic module is programmed to:
be in a first operating mode in which each touch pad is electrically activatable and a specific function is inactive,
be in a second operating mode in which the specific function is functionally active and drawing power, and
change from the first operating mode to the second operating mode in response to a detection of a predetermined number of the touch pads being simultaneously activated,
the predetermined number of the touch pads being simultaneously activated is at least two including an inner touch pad and an outer touch pad, the outer touch pad being positioned in an outer region that is adjacent to the periphery of the glass, and the inner touch pad being positioned in an inner region that is surrounded by the outer region, and
the predetermined number of the touch pads being simultaneously activated for changing from the first operating mode to the second operating mode is distinct from any other operation performable on the electronic module,
the specific function includes a chronograph function of the electronic module, and
when changing from the first operating mode to the second operating mode in response to the detection of the predetermined number of the touch pads being simultaneously activated, the electronic module is programmed to activate the chronograph function in response to only the detection of the predetermined number of the touch pads being simultaneously activated.

* * * * *